US005363464A

United States Patent [19]

Way et al.

[11] Patent Number: 5,363,464

[45] Date of Patent: Nov. 8, 1994

[54] DIELECTRIC/CONDUCTIVE WAVEGUIDE

[75] Inventors: James A. Way, Cupertino; Peter A. Way, San Jose, both of Calif.

[73] Assignee: Tangible Domain Inc., Los Altos, Calif.

[21] Appl. No.: 83,894

[22] Filed: Jun. 28, 1993

[51] Int. Cl.$^5$ .......... G02B 6/20; H01P 3/16

[52] U.S. Cl. .......... 385/125; 333/212; 333/238; 333/239; 333/246; 333/254

[58] Field of Search .......... 333/239–242, 333/1, 238, 246, 212, 24 R, 27, 260, 254; 385/123, 125, 127, 128, 141, 144, 146

[56] References Cited

U.S. PATENT DOCUMENTS

| | | | |
|---|---|---|---|
| 2,317,503 | 4/1943 | Usselman | 333/242 X |
| 3,221,279 | 11/1965 | Gross | 333/254 |
| 3,299,374 | 1/1967 | Schickle et al. | 333/241 |
| 3,436,141 | 4/1969 | Comte | 333/242 X |
| 3,444,487 | 5/1969 | Krank et al. | 333/241 |
| 3,585,540 | 6/1971 | Schuttloffel et al. | 333/241 |
| 3,648,201 | 3/1972 | Gissel | 333/241 |
| 3,772,772 | 11/1973 | Lehnert | 333/235 X |
| 4,020,875 | 5/1977 | Akiba | 333/239 X |
| 4,194,808 | 3/1980 | Marhic et al. | 385/125 |
| 4,652,083 | 3/1987 | Laakmann | 385/125 |
| 4,688,892 | 8/1987 | Laakmann | 385/125 |
| 4,688,893 | 8/1987 | Laakmann | 385/125 |
| 4,730,888 | 3/1988 | Darcie et al. | 385/24 |
| 4,805,987 | 2/1989 | Laakmann et al. | 385/125 |
| 4,918,049 | 4/1990 | Cohn et al. | 333/239 X |
| 4,930,863 | 6/1990 | Croitoriu et al. | 385/125 |
| 5,105,055 | 4/1992 | Mooney et al. | 333/238 X |

FOREIGN PATENT DOCUMENTS

| | | | |
|---|---|---|---|
| 59-74704 | 4/1984 | Japan | 333/239 |
| 60-218902 | 11/1985 | Japan | 333/239 |
| 585290 | 2/1947 | United Kingdom | 333/239 |

*Primary Examiner*—John D. Lee

*Attorney, Agent, or Firm*—Leo V. Novakoski; Edward J. Radlo

[57] ABSTRACT

A dielectric/conductive waveguide (20) includes a dielectric housing (22) having a longitudinal axis (14) and a central channel (29). A conductive layer (24,25) is affixed to the inner surface (21) and/or the outer surface (23) of the housing (22) to confine electromagnetic radiation (17) within the waveguide (20). Ribs (50,64) protruding into the channel (29) may be used to further confine the radiation (17). Sections of waveguide (20) may be combined using connectors (30). A local area network (90) can be formed using a plurality of sections of waveguide (20), computers (94), and bi-directional couplers (92). Air gaps (98) may break up the waveguide (20) at various places.

15 Claims, 7 Drawing Sheets

DIELECTRIC/CONDUCTIVE WAVEGUIDE

TECHNICAL FIELD

This invention relates to the field of waveguides for transmission of electromagnetic radiation, and in particular to waveguides having a dielectric waveguide housing to which a conductive layer has been affixed to confine the electromagnetic radiation within the waveguide.

BACKGROUND ART

In the last few years there has been an explosive growth in the demands placed on existing communication systems to provide rapid transmission of voice, data, and video signals. These demands place a premium on the provision of dependable, inexpensive, broad band transmission means for use in such systems. Presently, the most widely used transmission means are cables, fiber optic waveguides, and wireless connections. However, users choosing between these various transmission media must balance their need for high capacity data links against the high cost of such links.

Of the transmission media available, cables are typically the least expensive, and are used as data links in most privately owned computer networks. However, the rate of data transmission on cables is limited by the capacitance of the cables. As the rate of data transmission is increased, the capacitance of the cable shunts increasing portions of the signal, resulting in signal attenuation and distortion. In addition, impedance mismatches in cables produce reflections of high frequency signals that interfere with and degrade primary signals. Furthermore, dielectric losses force the designer to confront a maximum cable length that can be used without amplification. For these reasons, cables are generally limited to transmitting electromagnetic signals at frequencies below 1 GHz. Very low loss cables, such as Heliax, which are capable of transmitting higher frequency signals, are expensive to produce.

The medium of choice for communication systems in most large scale operations is the fiber optic waveguide. These waveguides transmit data encoded as optical signals, and provide bandwidths superior to electromagnetic cable systems. However, fiber optic waveguides are expensive to manufacture, install, and maintain, and these costs are not likely to fall in the foreseeable future. As a result, fiber optic waveguides are used primarily in toll communication systems where the high costs are supported by access fees paid by the large numbers of users. For example, wide area networks (WANs) for transmitting video, voice, and data signals over long distances support sufficient traffic to justify the capital outlay necessary for fiber optic systems. In contrast, local area networks (LANs), which are typically used for communications among the computers within a company, are privately owned and supported. Consequently, the high cost of fiber optics is difficult to justify, particularly since these systems are not easily moved if the company changes location.

High frequency wireless communications using microwaves are limited by the number of channels available for broadcast type transmission, and the capital cost and logistical problems of implementing broad based, directional transmission signals.

DISCLOSURE OF INVENTION

The present invention is an inexpensive, dielectric/-conductive waveguide (20) for high frequency electromagnetic radiation (17) that provides reliable, broad band data transmission suitable for a wide variety of communication systems. Dielectric/conductive waveguides (20) of the present invention include a housing (22) made of a dielectric material which is formed into a duct having a central longitudinal open channel (29). The cross-sections of the central channel (29) and the housing (22) exterior are selected to minimize the loss and to maximize the flexibility and structural integrity of the waveguide (20). Conducting material (24,25) affixed to the inner surface (21) and/or the outer surface (23) of the dielectric housing (22) confines the high frequency radiation (17) within the waveguide (20). This structure provides transmission and loss characteristics comparable to those of waveguides (10) constructed entirely of metal, but at considerably lower cost.

Additional transmission channels (42) may be supported in dielectric/conductive waveguides (20) of the present invention by affixing a conducting layer (24) to the inner surface (21) of the dielectric housing (22) in longitudinally directed, electrically isolated strips (36), and adding a second conductive layer (25) to the outer surface (23) of the dielectric housing (22). The resulting transmission lines (42) each support a separate communication channel operating at a frequency below the waveguide mode cut-off frequency of the waveguide (20). These lower frequency communication channels operate simultaneously with the waveguide mode channel supported by the waveguide (20), and expand the data handling capacity of the waveguide (20).

Waveguides (20) in accordance with the present invention may be used to create networks (90), providing broad band communication comparable to that of fiber optic networks at substantially lower cost. For example, local area networks (90) providing broad band communication among local computers or work stations (94) can be implemented using dielectric/conductive waveguides (20) in accordance with the present invention. Bi-directional couplers (92) couple signals between the local area network (90) and the computers (94), and between the network (90) and a WAN (100). WAN (100) may be implemented using dielectric/conductive waveguides (20) in accordance with the present invention. Alternatively, network (90) may be coupled to a fiber optic WAN (100) by means of an active coupling scheme.

Networks (90) based on waveguides (20) can include open air links (98), which provide flexibility in areas where placement of cables or waveguides (20) is difficult. By impedance matching (96) the waveguide-to-air and air-to-waveguide regions of the open air links (98), losses and signal distortions in network (90) can be minimized.

DETAILED DESCRIPTION OF THE PREFERRED EMBODIMENTS

Figure 1:
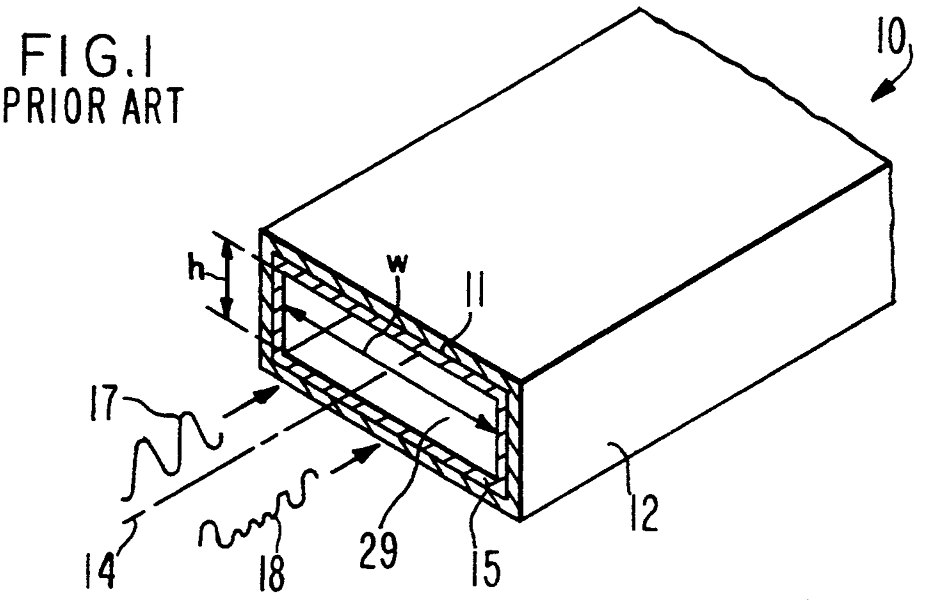
FIG.1 PRIOR ART
FIG. 1 is a fragmented isometric view of a conventional waveguide 10 having an all metal housing 12.

Referring to FIG. 1, there is shown conventional rectangular waveguide 10, including a housing 12 that defines a longitudinal axis 14 along which electromagnetic radiation 17 propagates through open channel 29. The propagating electromagnetic radiation 17 may provide power to remote locations or may be modulated to transmit data signals 18. Housing 12 is typically made from metals such as bronze, copper, or aluminum. An optional coating 15 of high conductivity metal is shown deposited on inner surface 11 of housing 12. Coating 15 is typically a high conductivity metal such as silver or copper, and may be added to inner surface 11 to minimize ohmic losses that arise from currents generated in housing 12 by the electromagnetic fields 17.

The dimensions of housing 12 are determined by the wavelength of the electromagnetic radiation 17 used to carry signals 18. For a housing 12 having a width, w, and height, h, the longest wavelength of electromagnetic radiation 17 that can be propagated by waveguide 10 is given by $\lambda_c=[(m/2w)^2+(n/2h)^2]^{-\frac{1}{2}}$, where m and n are mode numbers of the electromagnetic radiation 17. Thus, for electromagnetic radiation 17 in the microwave regime (greater than 1 GHz), h and w will be on the order of millimeters.

One drawback of conventional waveguide 10 is the high cost of the metals used. For example, a typical metal waveguide 10 made from copper may cost up to ten dollars per foot, Further, long distance communication links require that a large number of waveguides 10 be coupled together in series. Typically, waveguides 10 are bolted or brazed together to create an extended data link. Both processes are time consuming and add to the cost of using metal waveguides 10 in communication links. In addition, the brazing process may distort waveguides 10, and this distortion may cause signal 18 degradation. Further, metal waveguides 10 are subject to corrosion if exposed to water or certain chemicals, and such corrosion may also degrade signals 18 by altering the shape of waveguide 10. Finally, once deformed, conventional waveguides 10 do not recover their shape and consequently become useless.

Figure 2A:
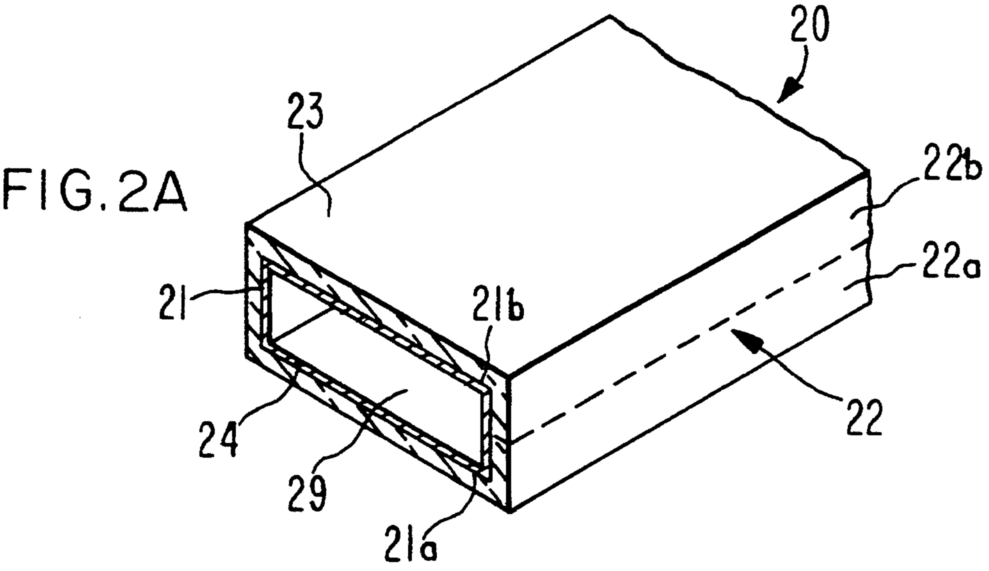
FIG. 2A is a fragmented isometric view of a dielectric/conductive waveguide 20 having a rectangular cross-section housing 22 of dielectric material and a conductive layer 24 deposited on the inner surface 21 of housing 22, in accordance with the present invention.
Figure 2B:
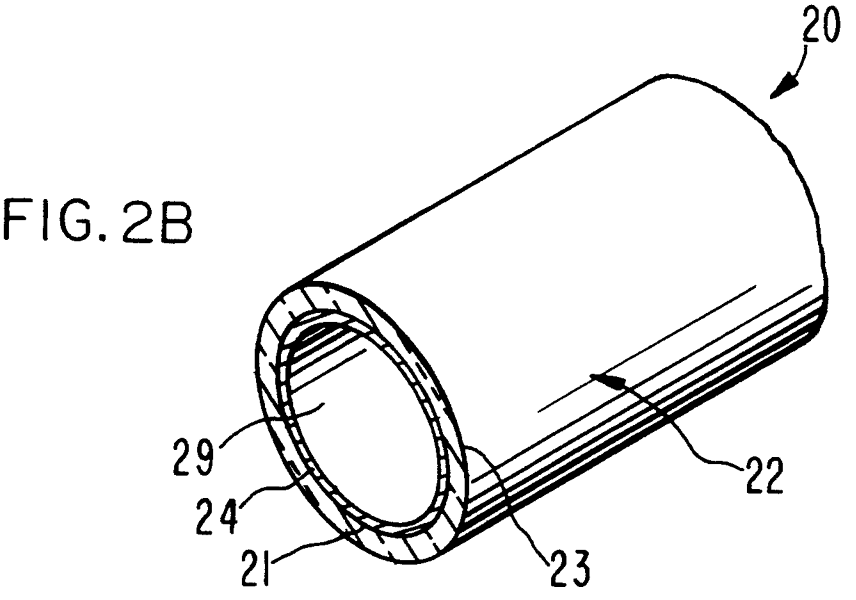
FIG. 2B is a fragmented isometric view of a dielectric/conductive waveguide 20 having a circular cross-section housing 22 of dielectric material and a conductive layer 24 deposited on the inner surface 21 of the housing 22, in accordance with the present invention.

Referring now to FIG. 2A, there is shown a rectangular waveguide 20 in accordance with the present invention, including a housing 22 having an inner surface 21, an external surface 23, and a conductive layer 24 overlaid on inner surface 21. Housing 22 is made from a dielectric material which can be formed into a selected shape and can recover the selected shape following moderate deformations. Suitable dielectric materials for housing 22 include PVC plastic and ABS plastic (butyl nytril styrene). Waveguide 20 is shown having rectangular cross-sections for inner surface 21 and outer surface 23. However, other cross-sectional shapes may be chosen, for ease of manufacture and/or structural stability. For example, an alternative embodiment of waveguide 20 in accordance with the present invention, including a cylindrical housing 22 having inner surface 21, outer surface 23, and conductive layer 24, is shown in FIG. 2B.

Figure 2C:
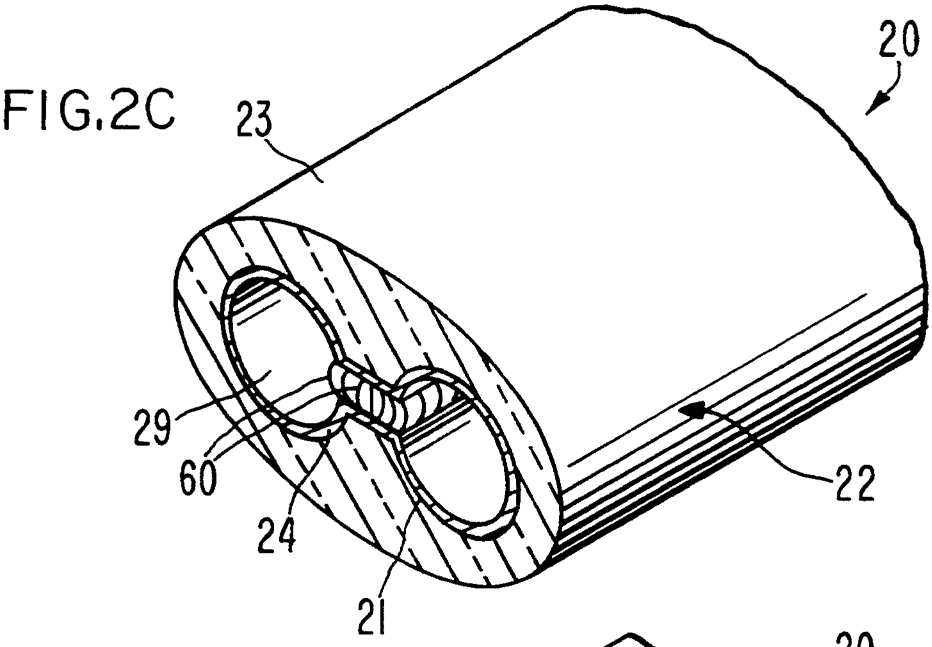
FIG. 2C is a fragmented isometric view of a dielectric/conductive waveguide 20 having a housing 22 of dielectric material having an oval cross-section outer surface 23 and a combination circular and rectangular cross-section inner surface 21, in accordance with the present invention.

Referring to FIG. 2C, there is shown another embodiment of waveguide 20 having an oval (and hence very rigid) cross-section for outer surface 23. The cross-section of inner surface 21 comprises two circles joined along their radii by a rectangle. The electromagnetic advantage of this latter cross-section is discussed below in conjunction with FIG. 5B.

Conductive layer 24,25 is a high conductivity metal such as copper or silver, which may be affixed to inner surface 21 and/or outer surface 23 during formation of housing 22. For example, conductive layer 24 may be affixed to the surfaces 21,23 of housing 22 by depositing copper or silver during extrusion of dielectric material into housing 22.

Alternatively, layers 24,25 may be affixed to housing 22 in a separate step, such as a deposition step. For example, for the FIG. 2A embodiment, housing 22 may be extruded in two sections **22*a*,22*b*; then conductive layer 24 is deposited on inner surfaces 21*a*,21*b* of sections 22*a*,22*b*, respectively; then sections 22*a*,22*b*** are joined together. The deposition may be performed using electrolysis.

Figure 10:
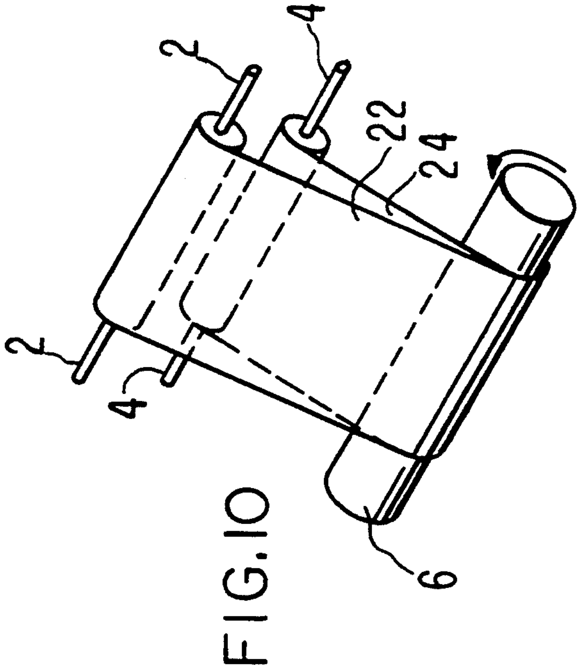
FIG. 10 is an elevational view of a mandrel 6 used in a first embodiment for making the present invention.

Alternatively, as illustrated in FIG. 10, dielectric/-conductor waveguides 20 can be formed by combining continuous sheets of aluminum or other metal 24 (or a metallized plastic film 24) and styrene (or other dielectric) film 22 on a rotating mandrel 6 to form a continuous dielectric/conductive layer 22,24 that is then shaped to form the desired structure 20. The plastic may be Mylar. The metallized portion 24 coats either the inner 21 or outer surface 23 of the resulting dielectric housing 22. Spool 2 holds the rolled dielectric film 22 and spool 4 holds the rolled metallized sheet 24. The sheets 22,24 may be rolled on the mandrel 6 in alternating helical strips, such as is common e.g. for the hollow cardboard cylinders within rolls of paper towels or toilet paper. This technique lends added strength to the resulting waveguide 20.

Figure 11:
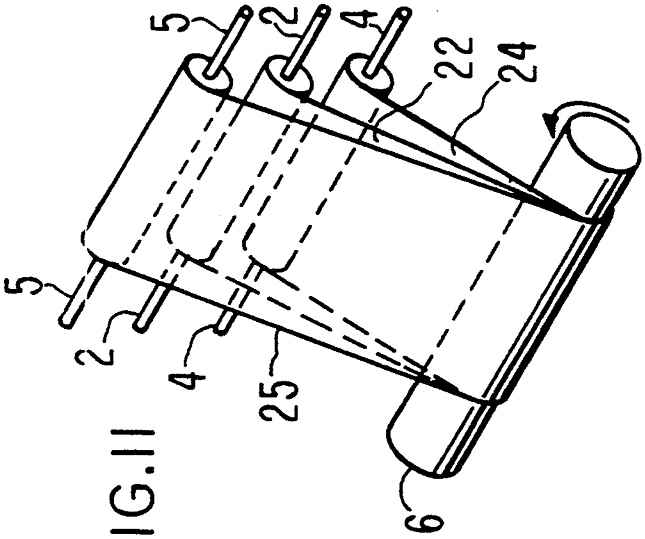
FIG. 11 is an elevational isometric view of a mandrel 6 used in a second embodiment for making the present invention.

If it is desired for conductive material 24,25 to coat both the inner 21 and outer 23 surfaces, respectively, of the resultant housing 22, the embodiment illustrated in FIG. 11 is used. Said embodiment is identical to that shown in FIG. 10 except that a second continuous sheet of aluminum or other metal 25 (or metallized plastic film 25) is used. Spool 5 holds the rolled metallized sheet 25. Sheets 24 and 25 are positioned on opposing sides of sheet 22.

Alternatively, waveguide 20 can be formed by cold rolling, e.g., sheets 22,24,25 are combined between roller presses. In such a case, dielectric 22 is a malleable plastic.

Any of the above processes for manufacturing waveguide 20 can be performed on site at the premises of the end user. This can lead to lower installation costs.

Figure 2D:
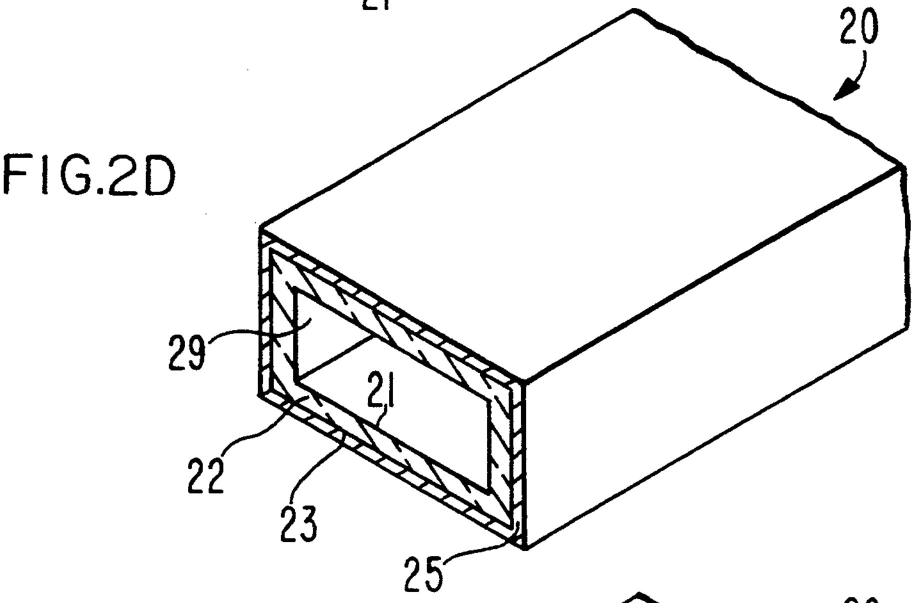
FIG. 2D is a fragmented isometric view of a dielectric/conductive waveguide 20 having a rectangular cross-section housing 22 of dielectric material and a conductive layer 25 affixed to the outer surface 23 of housing 22, in accordance with the present invention.

As noted above, the primary purpose of conductive layer 24 is to confine electromagnetic signals 18 within waveguide 20. Accordingly, conductive layer 24 may be deposited or otherwise placed on inner surface 21, on outer surface 23, or on both inner surface 21 and outer surface 23. (Conductive material 24 is referred to as conductor 25 when it is located on outer surface 23.) Referring to FIG. 2D, there is shown a rectangular waveguide 20 having conductive layer 25 affixed to outer surface 23. In this embodiment, a portion of electromagnetic signal 18 propagates in the dielectric material of housing 22. Consequently, the choice of dielectric material used in housing 22 is more critical in waveguide 20 of FIG. 2D than it is in waveguide 20 of FIG. 2A. For example, PVC plastic is a lossy material compared to ABS plastic (butyl nytril styrene) and is therefore less suitable in waveguide 20 of FIG. 2D than in waveguide 20 of FIG. 2A.

Figure 2E:
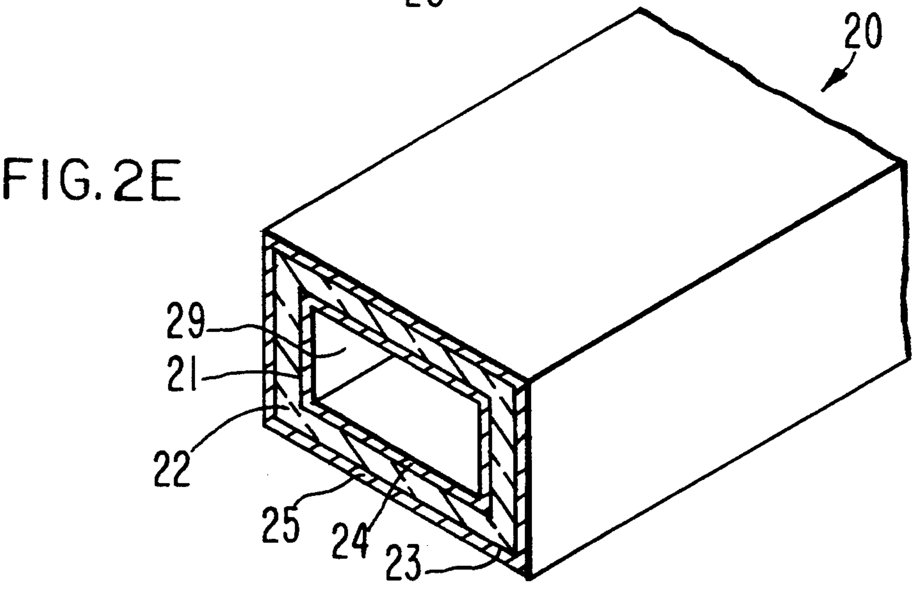
FIG. 2E is a fragmented isometric view of a dielectric/conductive waveguide 20 having a rectangular cross-section housing 22 of dielectric material and conductive layers 24,25 affixed to the inner and outer surfaces 21,23, respectively, of housing 22, in accordance with the present invention.

Referring now to FIG. 2E, there is shown a waveguide 20 having conductive layers 24,25 affixed to inner surface 21 and outer surface 23, respectively. When conductive layer 24 is continuous, electromagnetic signals 18 are confined within inner surface 21 of housing 22. Accordingly, the choice of dielectric material for housing 22 is less critical than in the case of waveguide 20 of FIG. 2D.

Conductive layer 24,25 is typically between about 1 and 2 mils thick, depending on the frequency of carrier electromagnetic radiation 17. This frequency dependence arises from resistive losses in waveguide 20 due to surface currents generated in conductive layer 24,25 by carrier electromagnetic radiation 17. In particular, the power loss in waveguide 20 is given by:

$$P=0.5R_SH_t^2$$

where $H_t$ is the tangential magnetic field induced in conductive layer 24,25 by carrier electromagnetic radiation 17, and $R_s$ is the surface resistance of conductive layer 24,25. $R_s$ is given by $\rho/\delta$, where $\rho$ is the resistivity of conductive layer 24,25 and $\delta$, the skin depth of conductive layer 24,25, is proportional to $\nu^{-\frac{1}{2}}$, the frequency of carrier electromagnetic radiation 17.

One of the principal advantages of waveguide 20 is that the dielectric materials from which housing 22 is constructed are relatively inexpensive. In addition, these dielectric materials are relatively easy to shape into the desired housing 22, e.g. by the extrusion process described above, and do not deteriorate when exposed to moisture or other chemicals that can easily destroy metal waveguides 10. Thus, they are suitable for use in wet environments or environments in which corrosive vapors may be present. A positive pressure of inert gas (such as nitrogen) in waveguide 20 can be used to further protect conductive layer 24, by preventing moisture or chemical agents from diffusing into housing 22. Inert gas atmospheres are nonflammable and so prevent waveguides 20 from becoming conduits for spreading fires. In addition, they prevent the growth of bacteria or algae, which would otherwise proliferate within waveguide 20, and alter its transmission properties. Since waveguides 20 of the present invention do not contain metallic housing 12 and optional conductive layer 15 of the prior art, unwanted galvanic reactions between dissimilar metals are not possible as they are in prior art waveguides 10.

Figure 3A:
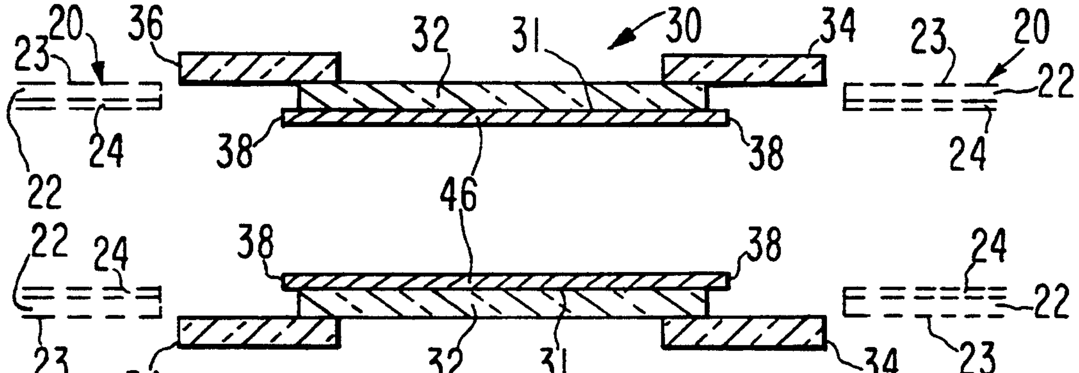
FIG. 3A is a side cross-sectional view of a connector 30 for joining two sections of waveguide 20 having conductive layers 24 affixed to their inner surfaces 21 in accordance with the present invention.
Figure 3B:
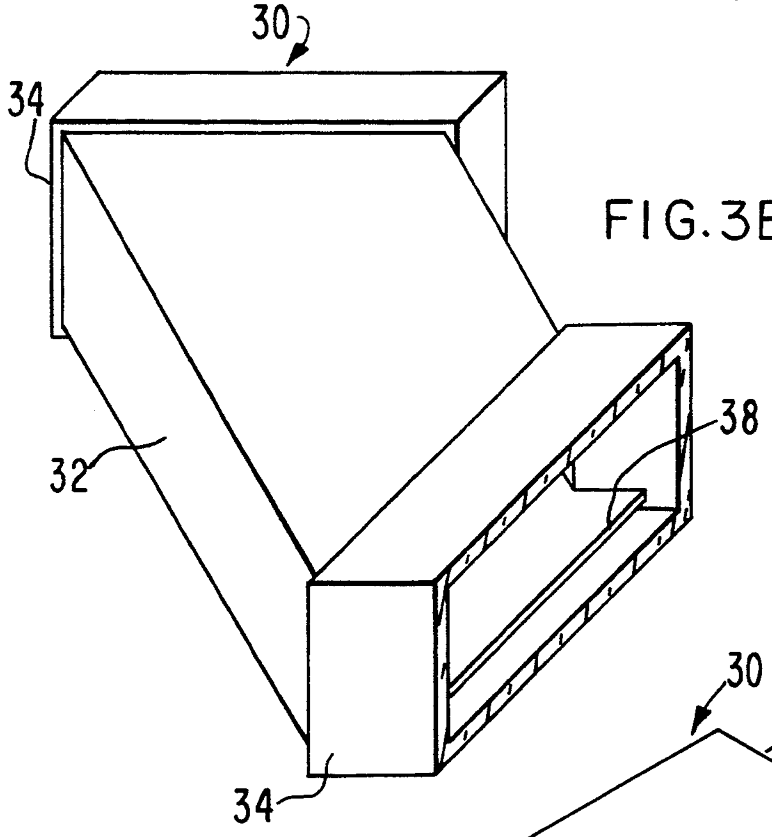
FIG. 3B is a fragmented isometric view of a connector 30 for joining two sections of waveguide 20 having conductive layers 24 affixed to their inner surfaces 21 and including a 90° bend for redirecting electromagnetic signals 18.
Figure 3C:
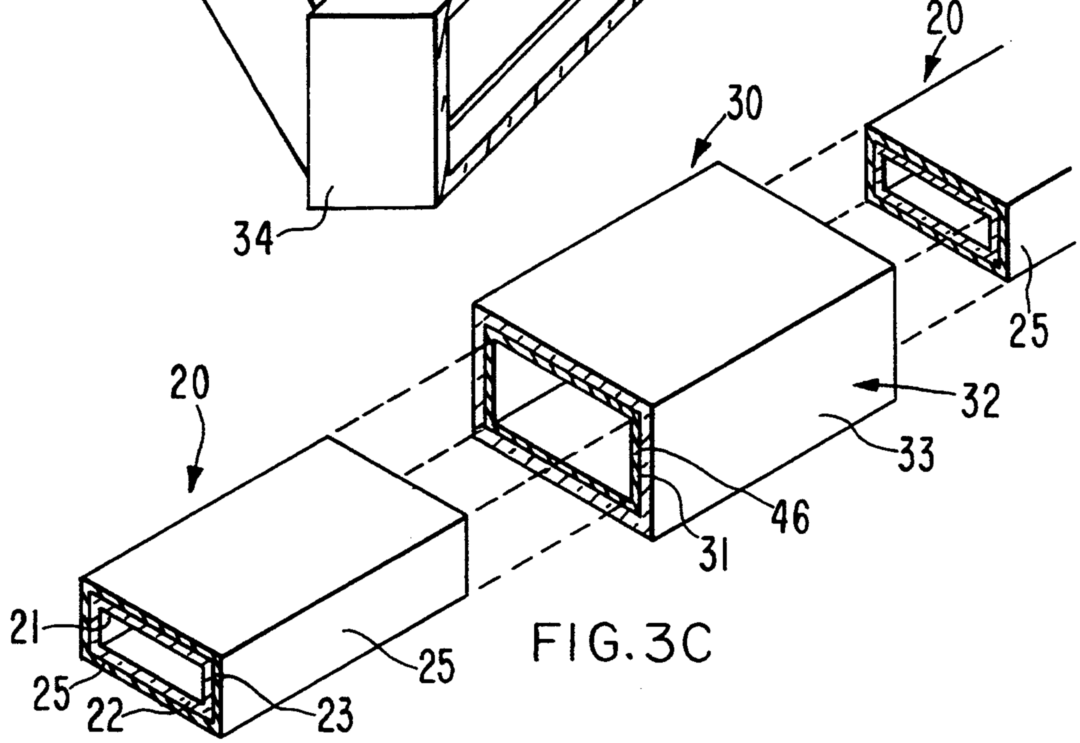
FIG. 3C is a fragmented isometric view of a connector 30 for joining two sections of waveguide 20 having conductive layers 24 affixed to their outer surfaces 23, in accordance with the present invention.

Couplings between sections of waveguide 20 can be made simply, using the connectors 30 shown in FIGS. 3A, 3B, and 3C. Referring to FIG. 3A, there is shown a connector 30 for coupling two waveguides 20 of the type having conductive layer 24 affixed to inner surface 21. Connector 30 includes a dielectric housing 32 having substantially the same dimensions as housing 22 of waveguide 20, and a dielectric sleeve 34 for closely receiving outer surface 23 of each housing 22. A conductive layer 46 is affixed to inner surfaces 31 of housing 32, so that conductive layer 46 is substantially coplanar with conductive layer 24 of each waveguide 20. A small lip 38 of conductive layer 46 extends beyond each end of inner surface 31 to overlap a corresponding conductive layer 24 of waveguide 20 and provide electrical contact therewith. Contact between conductive layers 24 and 46 may be improved by adding a conductive adhesive to lip 38.

Referring now to FIG. 3B, there is shown a connector 30 including a 90° bend to redirect electromagnetic radiation 17. The 90° bend is created by attaching sleeves 34 to housing 32 at 45° angles. This type of connector is shown in FIG. 10. Bends of any degree may be created by connecting sleeves 34 to housing 32 at appropriate angles.

Referring now to FIG. 3C, there is shown a connector 30 for coupling together two waveguides 20 of the type having conductive layer 25 affixed to outer surface 23. Connector 30 includes a housing 32 having an inner surface 31, an outer surface 33, and a conductive layer 46 affixed to inner surface 31. Housing 32 is dimensioned to closely receive each waveguide 20, including conductive layer 25, so that conductive layers 25 and 46 are in good electrical contact. As in the case of connector 30 depicted in FIG. 3A, application of a conductive adhesive to conductive layer 46 prior to inserting waveguides 20 into connector 30 will insure better long term electrical contact.

Figure 4:
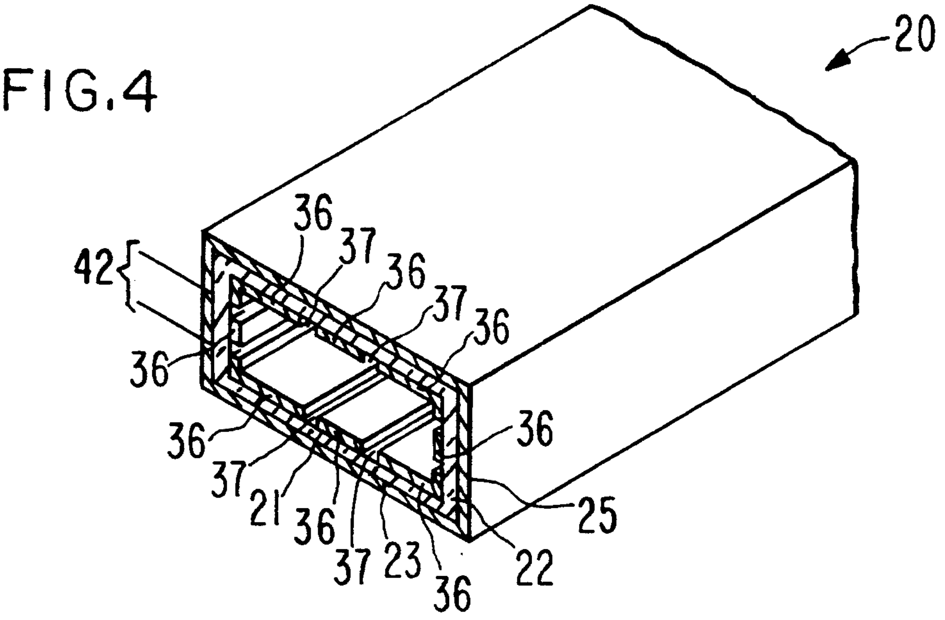
FIG. 4 is a fragmented isometric view of a dielectric/conductive waveguide 20, including microstrip transmission lines 42 for simultaneous transmission of electromagnetic signals 18 using both waveguide modes and microstrip transmission modes, in accordance with the present invention.

Referring now to FIG. 4, there is shown an alternative embodiment of a waveguide 20 in accordance with the present invention. Waveguide 20 includes a housing 22 made of a dielectric material as discussed above. However, conductive layer 24 has been affixed to inner surface 21 of housing 22 in such a way that a plurality of longitudinally oriented conductive strips 36 are formed, isolated by longitudinally oriented gaps 37. In addition, a second conductive layer 25 has been affixed to external surface 23 of housing 22. Conductive layer 25 is typically grounded. Conductive strips 36 in conjunction with dielectric housing 22 and grounded conductive layer 25 form a plurality of microstrip transmission lines 42, each of which may serve as a separate channel for transmission of electromagnetic signals 18. These channels are in addition to the channel carrying waveguide mode electromagnetic signals 18. Electromagnetic signals 18 transmitted on these microstrip transmission lines 42 can be propagated on carrier electromagnetic radiation 17 having longer wavelengths than would be supportable in waveguide 20 alone. This is because these microstrip transmission lines 42 support a lower cut-off frequency, fc, than comparably sized waveguides 20 alone.

Figure 5A:
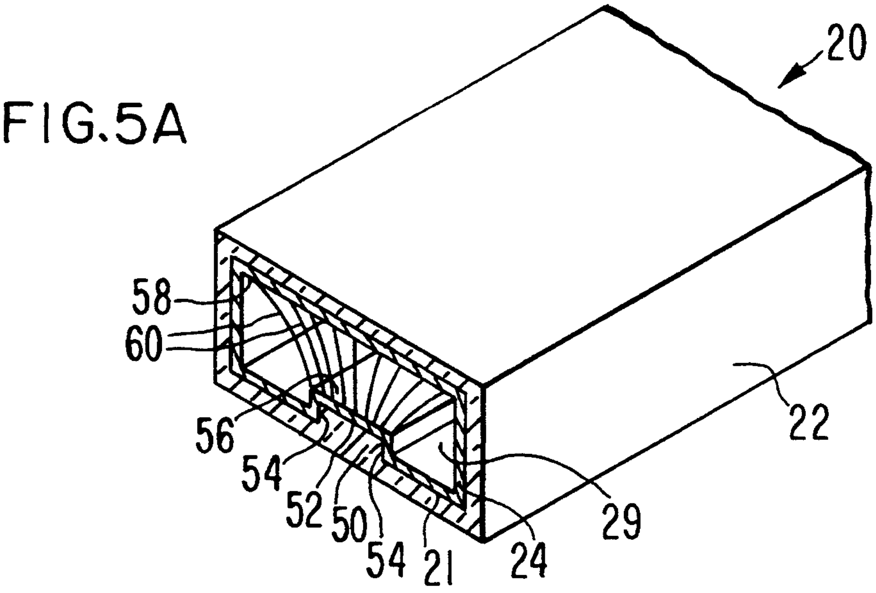
FIG. 5A is a fragmented isometric view of a dielectric/conductive waveguide 20, including a rib 50, in accordance with the present invention.
Figure 5B:
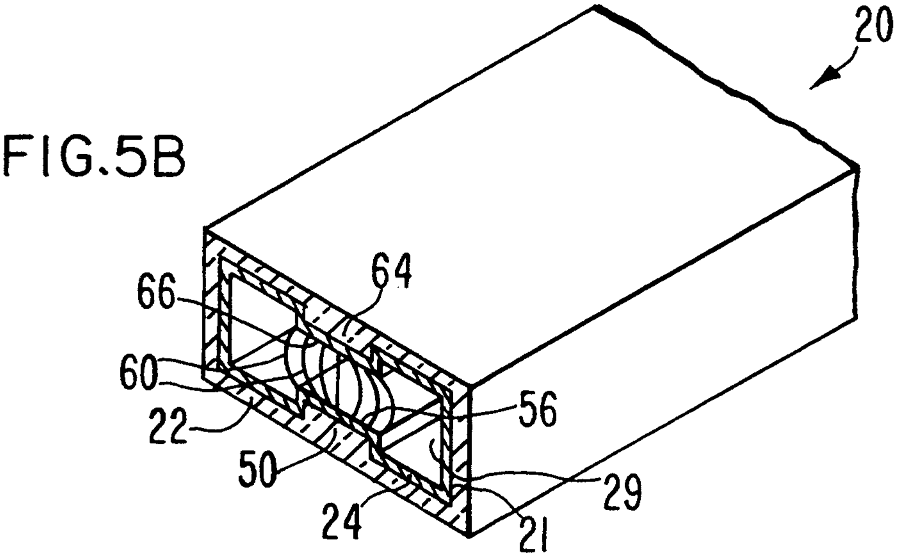
FIG. 5B is a fragmented isometric view of a dielectric/conductive waveguide 20 including a pair of ribs 50,64 on opposite inner faces of the waveguide 20, in accordance with the present invention.

Referring now to FIGS. 5A and 5B, there are shown additional embodiments of waveguide 20 in accordance with the present invention. Referring first to FIG. 5A, there is shown a waveguide 20 including a dielectric housing 22 having a substantially rectangular cross-section with a rectangular rib 50 of dielectric material oriented longitudinally along one face of inner surface 21 and extending through channel 29. A conductive layer 24 is affixed to inner surface 21, including surfaces 52, 54 of rib 50. Also shown in FIG. 5A is a schematic representation of an electromagnetic field 60 created by propagation of an electromagnetic signal 18 in waveguide 20. One end of electromagnetic field 60 terminates on horizontal conductive surface 56 formed by placing conductive layer 24 on horizontal surface 52 of rib 50. The remaining end of electromagnetic field 60 terminates on upper horizontal conductive surface 58 opposite rib 50. Due to the reduced contact between electromagnetic field 60 and conductive layer 24 on conductive surface 56 of rib 50, ohmic losses due to surface currents induced in conductive layer 24 are beneficially reduced.

Referring now to FIG. 5B, there is shown a waveguide 20 in accordance with the present invention in which a second dielectric rib 64 has been added to inner surface 21 of housing 22, opposite first rib 50. When coated with conducting layer 24, narrow conductive surfaces 56 and 66 further (as compared with the FIG. 5A embodiment) reduce the contact between electromagnetic field 60 and conductive layer 24. As a result, ohmic losses due to surface currents induced in conductive layer 24 by propagating electromagnetic signals 18 are further beneficially reduced. Waveguide 20 of FIG. 2C, in which outer surface 23 has an oval cross-section and inner surface 21 has a cross-section of combined circles and a rectangle, operates electromagnetically in a manner similar to waveguide 20 of FIG. 5B.

Figure 6:
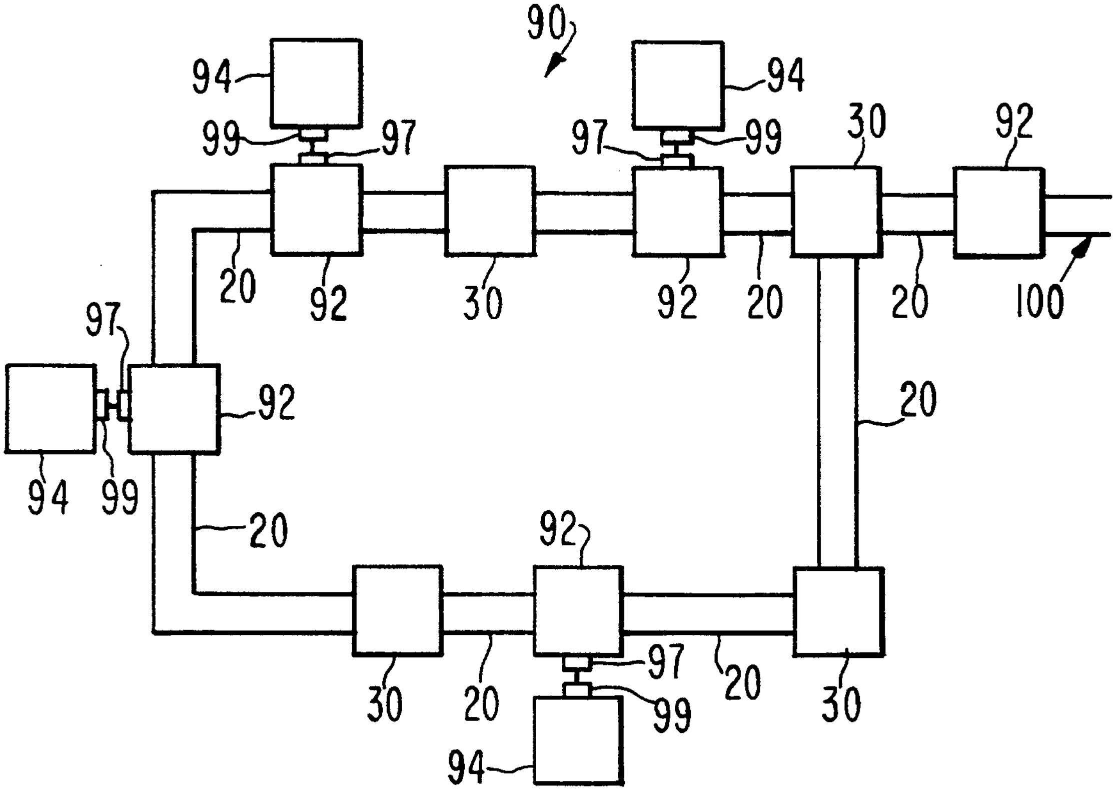
FIG. 6 is a schematic diagram of a local area network 90 implemented using waveguides 20 in accordance with the present invention.

Referring now to FIG. 6, there is shown a local area network 90 based on waveguides 20, connectors 30, and bi-directional couplers 92, for coupling signals 18 among computers or work stations 94. Also shown is a wide area network (WAN) 100 coupled to local area network 90 by a bi-directional coupler 92. As shown, WAN 100 may be implemented in waveguide 20 in accordance with the present invention. However, WAN 100 may also be implemented in fiber optics and coupled to network 90 via an active coupling device. Any of waveguides 20 as shown in FIGS. 2A, 2B, 2C, 2D, 2E, 4, 5A, and 5B may be used to construct local area network 90, which provides broad band communications at significantly lower cost than comparable fiber optic systems. Coupling each computer 94 to each bi-directional coupler 92 is a digital-to-analog converter 99 and a modulator/demodulator/carrier generator 97.

Bi-directional couplers 92 can be fabricated using techniques of the present invention. Such couplers 92 are eminently suitable for use in coupling signals 18 between computers 94 and waveguides 20, and between network 90 and WAN 100 in the embodiment where WAN 100 is fabricated using waveguide 20 of the present invention.

Figure 7:
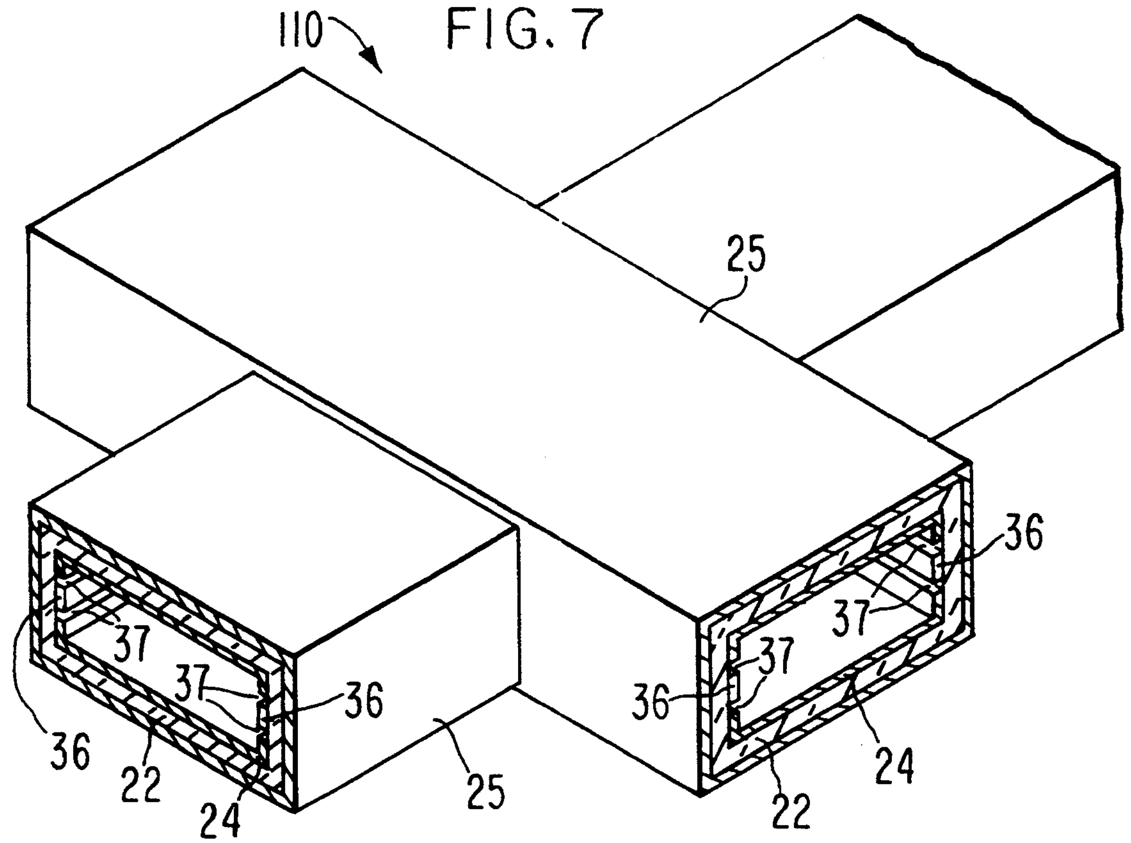
FIG. 7 is a fragmented isometric view of a bus-cross 110 implemented using waveguide 20, in accordance with the present invention.
Figure 8:
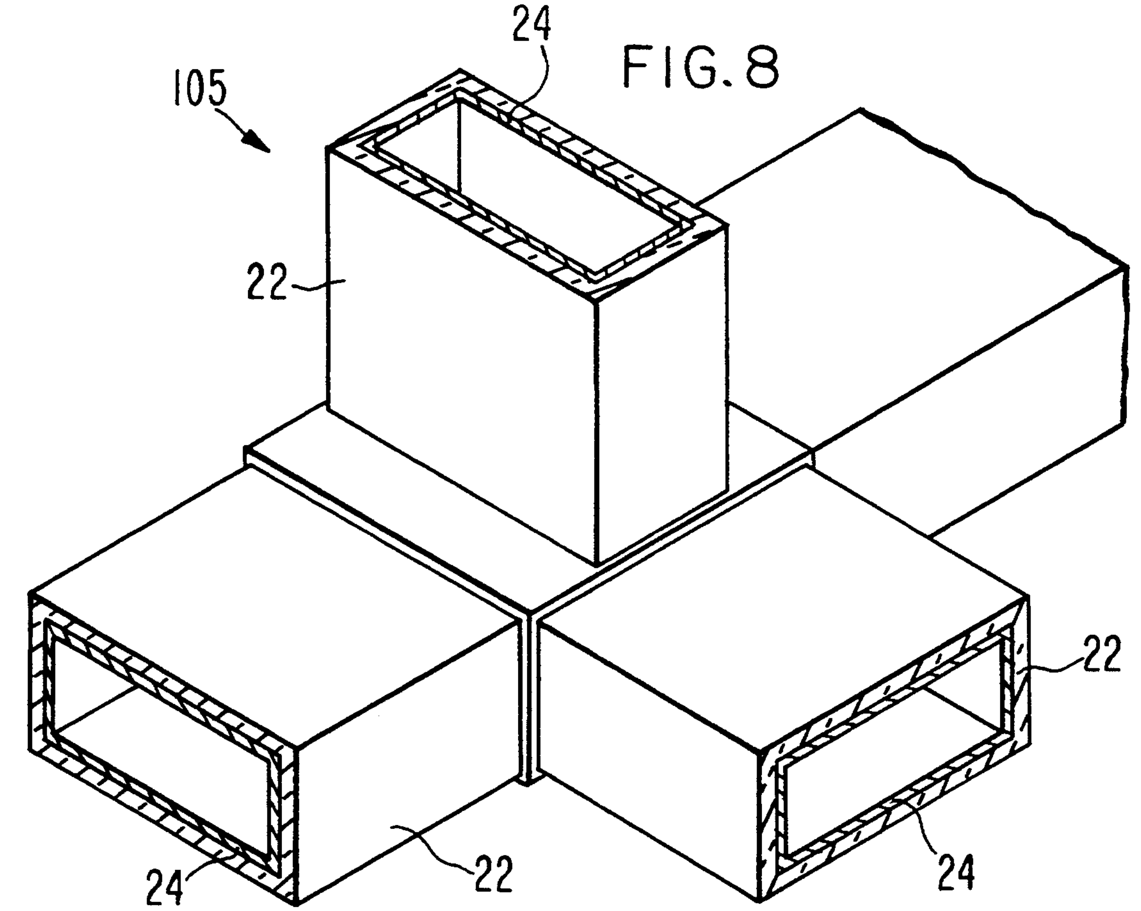
FIG. 8 is a fragmented isometric view of a T-section 105 implemented using waveguide 20, in accordance with the present invention.

FIGS. 7 and 8 illustrate hardware elements that can be used in network 90, using techniques of the present invention. FIG. 7 shows a bus-cross 110 suitable for use in a network 90. As shown, bus-cross 110 is implemented using the combined microstrip/waveguide mode waveguide 20 of FIG. 4. However, bus-cross 110 may be implemented using any of the waveguides 20 of FIGS. 2A, 2B, 2C, 2D, 2E, 5A, or 5B.

FIG. 8 shows a T-section 105 suitable for use in a network 90. As shown, T-section 105 is implemented using waveguide 20 of the type illustrated in FIG. 2A. However, T-section 105 may be implemented using any of the waveguides 20 of FIGS. 2B, 2C, 2D, 2E, 4, 5A, or 5B.

Figure 9:
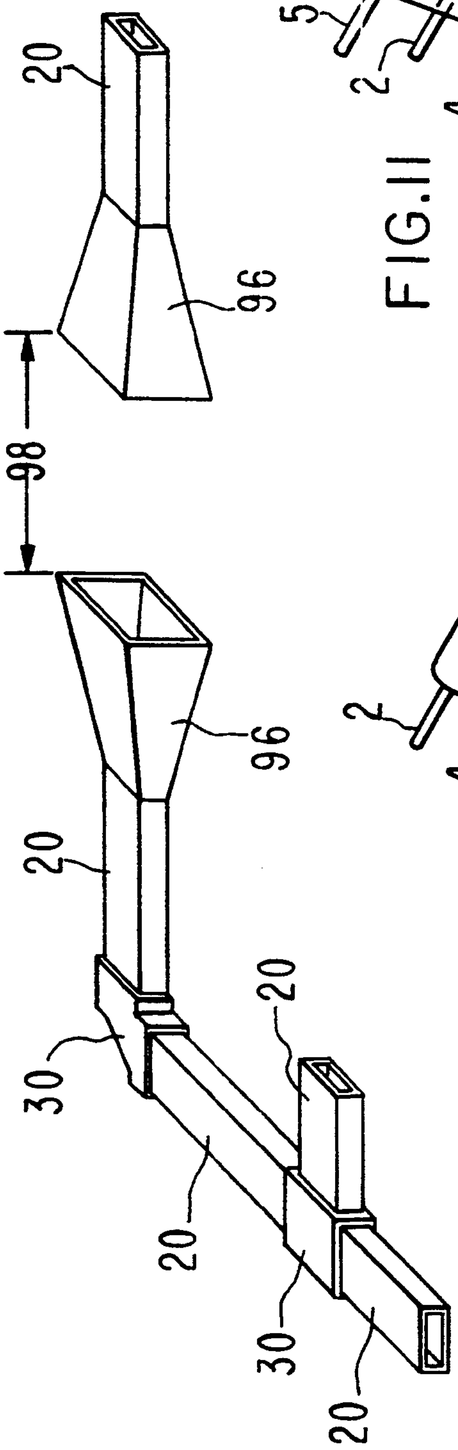
FIG. 9 is an elevational view of a portion of a network 90 using waveguide 20 of the present invention and open-air links 98.

FIG. 9 is an example of a network 90 using waveguide 20 of the type illustrated in FIG. 2A. Such a network 90 may be implemented using any of the waveguides 20 of FIGS. 2B, 2C, 2D, 2E, 4, 5A, or 5B. The illustrated connectors 30 are fabricated using techniques described above in connection with FIGS. 3A, 3B, and 3C. Gap 98 is a wireless passive air bridge, and may be positioned anywhere within a section of waveguide 20. The purpose of gap 98 is to provide flexibility to the system designer in designing for areas where placement of cables or waveguides 20 is difficult. Multiple gaps 98 may be used in the network 90. An impedance matching device 96 should be used at each transition between waveguide 20 and air, to minimize losses and signal distortions in the network 90. The impedance in waveguide 20 is typically 50 ohms, and the impedance in air is approximately 377 ohms. Impedance matching device 96 can be a flared section at the end of the waveguide 20 as illustrated in FIG. 9, a feed horn, a dielectric, a section of microstrip, a section of stripline, a scalar feed, or a stepped horn.

Thus, the present invention 20 provides an inexpensive, broad band data transmission medium that may be used in local and wide area networks 90, 100.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A dielectric/conductive waveguide for propagation of electromagnetic radiation, said waveguide comprising:

a dielectric housing having an outer surface and an inner surface defining an open longitudinal channel of selected cross-sectional size and shape, the cross-sectional size of the channel being selected to accommodate electromagnetic radiation having a frequency greater than a cut-off frequency; and a layer of conductive material affixed to at least one of said surfaces to confine the electromagnetic radiation within the waveguide as said radiation propagates through the channel;

wherein the cross-sectional shape substantially comprises a pair of circles joined along their radii by a rectangular section.

2. A dielectric/conductive waveguide for propagation of electromagnetic radiation, said waveguide comprising:

a dielectric housing having an outer surface and an inner surface defining an open longitudinal channel of selected cross-sectional size and shape, the cross-sectional size of the channel being selected to accommodate electromagnetic radiation having a frequency greater than a cut-off frequency; and a first layer of conductive material affixed to at least one of said surfaces to confine the electromagnetic radiation within the waveguide as said radiation propagates through the channel;

wherein the layer of conductive material is affixed to the inner surface of the housing in longitudinal strips that are electrically isolated from each other; and a second layer of conductive material is affixed to the outer surface of the housing, to form a series of microstrip transmission lines within the waveguide.

3. A dielectric/conductive waveguide for propagation of electromagnetic radiation, said waveguide comprising:

a dielectric housing having an outer surface and an inner surface defining an open longitudinal channel of selected cross-sectional size and shape, the cross-sectional size of the channel being selected to accommodate electromagnetic radiation having a frequency greater than a cut-off frequency; and a layer of conductive material affixed to at least one of said surfaces to confine the electromagnetic radiation within the waveguide as said radiation propagates through the channel;

wherein the cross-sectional shape of the channel is substantially rectangular, so that the inner surface has four faces, with a rectangular rib formed on one of the faces and protruding into the channel.

4. A dielectric/conductive waveguide for propagation of electromagnetic radiation, said waveguide comprising:

a dielectric housing having an outer surface and an inner surface defining an open longitudinal channel of selected cross-sectional size and shape, the cross-sectional size of the channel being selected to accommodate electromagnetic radiation having a frequency greater than a cut-off frequency; and a layer of conductive material affixed to at least one of said surfaces to confine the electromagnetic radiation within the waveguide as said radiation propagates through the channel;

wherein the cross-sectional shape of the channel is substantially rectangular, so that the inner surface has four faces, with a rectangular rib protruding from each of two opposing faces.

5. A dielectric/conductive waveguide for propagation of electromagnetic radiation, said waveguide comprising:

a dielectric housing having another surface and an inner surface defining an open longitudinal channel of selected cross-sectional size and shape, the cross-sectional size of the channel being selected to accommodate electromagnetic radiation having a frequency greater than a cut-off frequency; and a layer of conductive material affixed to at least one of said surfaces to confide the electromagnetic radiation within the waveguide as said radiation propagates through the channel; further comprising:

a plurality of bi-directional couplers connected to the waveguide at longitudinal intervals therealong; and a plurality of computers coupled to the plurality of bi-directional couplers, respectively; whereby a network is formed, permitting electromagnetic signals to travel between and among the computers.

6. The network of claim 5 further comprising at least one complete air gap interposed between sections of waveguide.

7. The network of claim 6 further comprising an impedance matching device interposed between each air gap and each section of waveguide.

8. The network of claim 5 wherein at least one of said computers is coupled to a bi-directional coupler via a digital-to-analog converter and a modulator/-demodulator/carrier generator.

9. The network of claim 5 further comprising:

at least one complete air gap interposed between sections of waveguide; and an impedance matching device interposed between each air gap and each section of waveguide, said impedance matching device being selected from the group of devices comprising a flared waveguide end, a feed horn, a dielectric, a section of microstrip, a section of stripline, a scalar feed, and a stepped horn.

10. A dielectric/conductive connector for coupling two sections of dielectric/conductive waveguide each having a hollow dielectric tube and a layer of conducting material affixed to the inside of the tube, said connector comprising:

a dielectric housing having first and second ends, an outer surface, and an inner surface defining an open longitudinal channel of selected cross-sectional size and shape, said size and shape being selected to match with said two sections;

a layer of conductive material affixed to said inner surface; and a dielectric sleeve fitting around said outer surface at each of said first and second ends.

11. The connector of claim 10 wherein the connector has an overall shape selected from the group of shapes comprising a 90° bend, a bus-cross, and a T-section.

12. The connector of claim 10 wherein;

each layer of conductive material protrudes beyond said dielectric housing at the first and second ends of said dielectric housing; and each of said two sections fits snugly between said layer of conductive material and said dielectric sleeve.

13. A dielectric/conductive connector for coupling two sections of dielectric/conductive waveguide each having a hollow dielectric tube and a layer of conducting material affixed to the outside of the tube, said connector comprising:

a dielectric housing having an outer surface and an inner surface defining an open longitudinal channel of selected cross-sectional size and shape, said size and shape being selected to match with said two sections; and a layer of conductive material affixed to said inner surface.

14. The connector of claim 13 wherein the connector has an overall shape selected from the group of shapes comprising a 90° bend, a bus-cross, and a T-section,

15. The connector of claim 13 wherein each of said two sections fits snugly within said layer of conductive material.

* * * * *

UNITED STATES PATENT AND TRADEMARK OFFICE

CERTIFICATE OF CORRECTION

PATENT NO. : 5,363,464

DATED : November 8, 1994

INVENTOR(S) : James A. Way and Peter A. Way

It is certified that error appears in the above-indentified patent and that said Letters Patent is hereby corrected as shown below:

Column 10, line 28, change "confide" to --confine--.

Signed and Sealed this

Thirty-first Day of January, 1995

Attest:

Bruce Lehman

BRUCE LEHMAN

*Attesting Officer*

*Commissioner of Patents and Trademarks*